March 31, 1959 D. O. FERRIS 2,880,286
ELECTRIC SIGNAL DEVICES FOR WEIGHING SCALES
Filed April 22, 1957 2 Sheets-Sheet 1
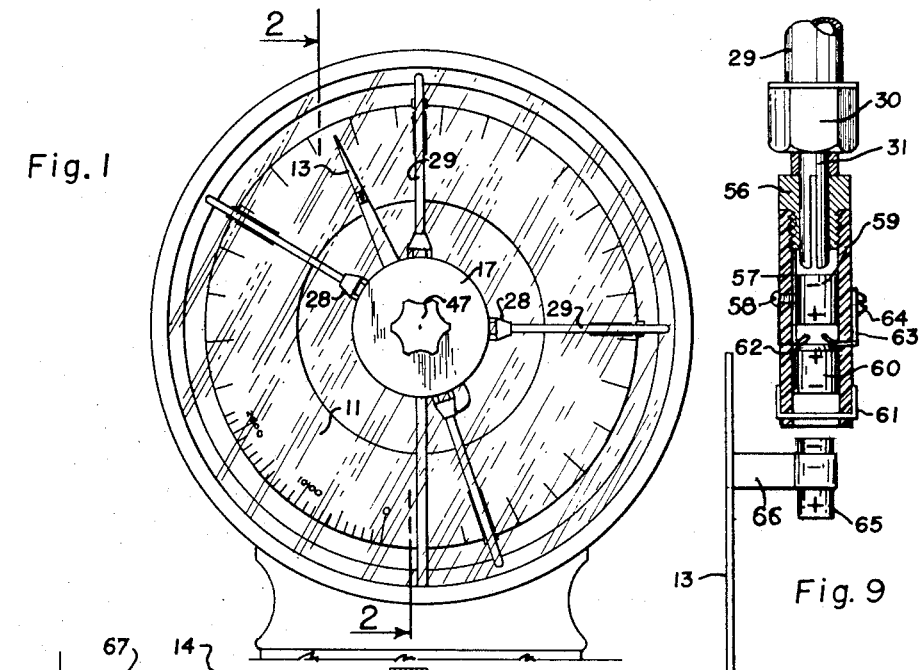
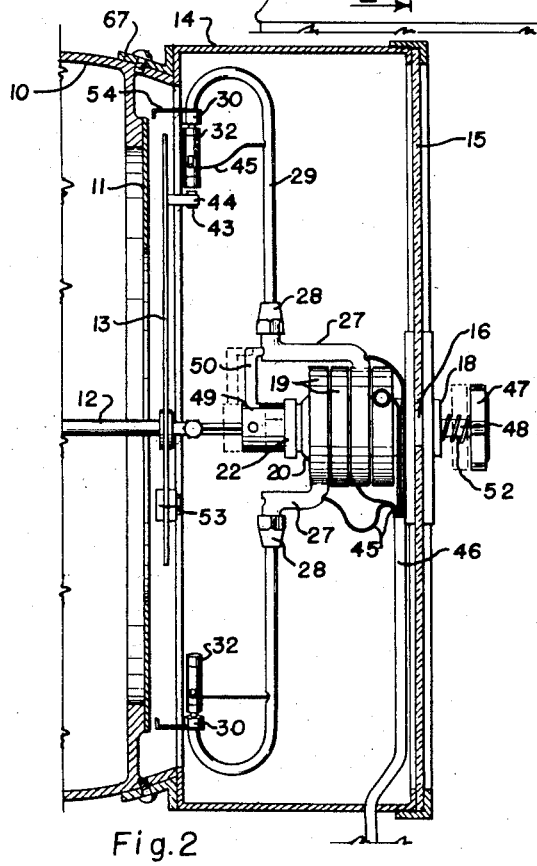
INVENTOR.
Daniel O. Ferris
BY
ATTORNEY March 31, 1959  D. O. FERRIS  2,880,286
ELECTRIC SIGNAL DEVICES FOR WEIGHING SCALES
Filed April 22, 1957  2 Sheets-Sheet 2

INVENTOR.
Daniel O. Ferris
BY
ATTORNEY

United States Patent Office 2,880,286
Patented Mar. 31, 1959

2,880,286

ELECTRIC SIGNAL DEVICES FOR WEIGHING SCALES

Daniel O. Ferris, Lakewood, Colo.

Application April 22, 1957, Serial No. 654,206

8 Claims. (Cl. 200—56)

This invention relates to a weighing scale, and more particularly to a scale signal device for controlling electric circuits in response to variations in weights applied to the scale.

The principal object of the invention is to provide a simple, efficient, and economical device which can be quickly and easily attached or applied to a conventional weighing scale, of the type having an index dial and a rotary indicating pointer or hand which indicates the weight on the index dial, which will close an electric circuit when the hand reaches a predetermined position on the dial with a minimum of interference with the accurate movement of the indicating hand.

Another object of the invention is to provide a plurality of circuit-closing devices which will be easily adjustable to a plurality of predetermined points along the index dial of the scale to close a plurality of electrical circuits in succession as the scale hand passes along the dial.

A further object is to provide a highly efficient, magnetically-operated switch for use on scale signal circuits, and to provide means for quickly and easily presetting the magnetic switches in desired positions relative to the weight indications on the index dial.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a face view of the dial portion of a conventional rotary-hand-type of weighing scale showing the invention applied thereto;

Fig. 2 is an enlarged, vertical section through the dial of Fig. 1, taken on the line 2—2, Fig. 1;

Fig. 3 is a detailed, perspective view illustrating the relation between the dial hand and the improved magnetically-operated switch;

Fig. 4 is a similar perspective view illustrating an alternate form of switch arrangement;

Fig. 9 is a detail section through an alternate form of magnetically-actuated electric switch employed in the improved scale signal device.

Figure 5:
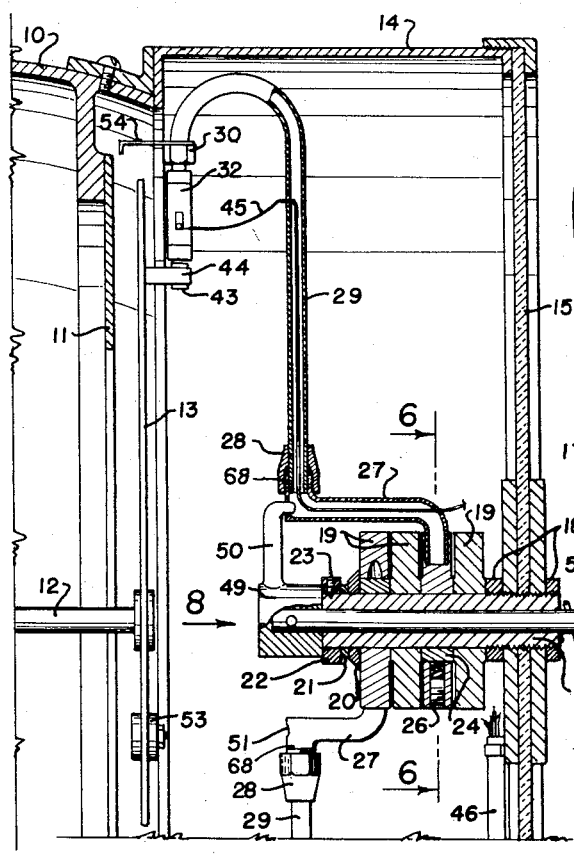
Fig. 5 is an enlarged, fragmentary section through the upper portion of the elements shown in Fig. 2.
Figure 6:
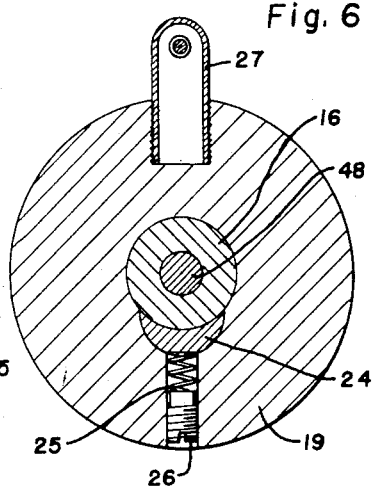
Fig. 6 is a still further enlarged, detail section, taken on the line 6—6, Fig. 5.

In the drawing a conventional scale head is indicated at 10 with its index dial at 11, hand shaft at 12 and indicating hand at 13. In a conventional scale head, the index dial 11 and the hand 13 are enclosed by a glass face plate. To apply this invention to a scale head, the glass face plate is removed and a cylindrical drum or housing 14 is mounted on the forward face of the head 10 in any desired manner, such as by means of suitable attachment clips 67. The front of the housing 14 is closed by a glass face plate 15 having an axially positioned opening.

A bearing tube 16 is mounted in the axial opening and is secured in position by means of two bearing plates 17 which are clamped to the opposite faces of the face plate 15 by means of suitable clamping nuts 18.

A plurality of hubs 19 are independently and rotatably mounted on the bearing tube 16 in juxtaposition and are maintained in place thereon by means of a compression washer 20, a slip washer 21, and a set collar 22. The set collar 22 is secured on the rear extremity of the bearing tube 16 such as by means of a suitable set screw 23 to prevent axial movement of the hubs 19.

Rotation of the hubs 19 upon the bearing tube 16 is resisted by means of friction shoes 24, there being one friction shoe 24 positioned within each hub in contact with the bearing tube 16. A compression spring 25 in each hub constantly urges the friction shoe thereon into frictional engagement with the bearing tube. The compression in the spring 25 can be adjusted by means of a set screw 26 in contact therewith.

A hollow arm bracket 27 is mounted in the periphery of each hub and extends radially outward, thence rearwardly therefrom, terminating in a radially extending threaded nipple 68. The arm brackets vary in length so that all of the nipples 68 lie in the same plane at right angles to the axis of the bearing tube 16.

Figure 7:
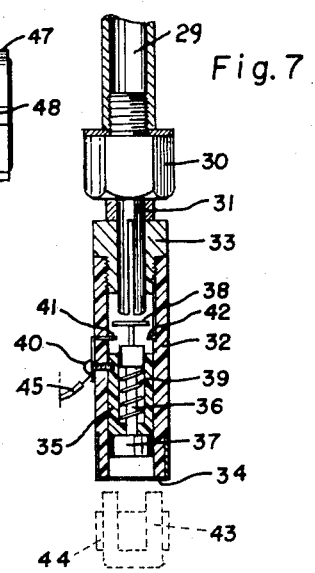
Fig. 7 is a detail section through a magnetically-actuated electric switch employed in the improved scale signal device.
Figure 8:
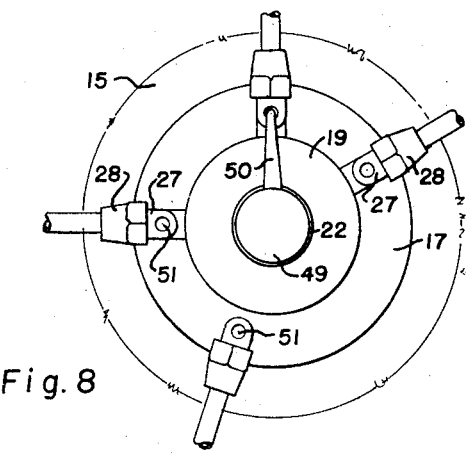
Fig. 8 is a fragmentary detail view looking in the direction of the arrow 8, in Fig. 5.

A tubular, hook-shaped, switch arm 29 is positioned in each of the threaded nipples and is adjustably clamped in place therein by means of a compression fitting 28 threaded onto the nipple. The switch arms 29 extend radially outward from the bearing brackets 27, thence arch rearwardly and radially inward, terminating forwardly of the path of the extremity of the indicating hand 13. A bushing 30, provided with a contact stud 31, is threaded into or otherwise mounted in the extremity of each switch arm. The studs project radially inward toward the projected axis of the hand shaft 12 and are designed to frictionally receive magnetically-operated switches, such as shown in detail in Fig. 7.

Each of the magnetically-operated switches comprises a tubular housing 32 of insulating material closed at one extremity by means of a metallic contact bushing 33 having an axial bore adapted to frictionally receive one of the studs 31. The studs are preferably split so that they will contract as the bushings are slipped thereover to frictionally maintain the latter in place. The other extremity of the housing 32 is closed by means of a plastic cap 34.

A switch assembly is enclosed in each housing 32. Each switch assembly consists of an insulating tube 35 containing a plunger 36 having a magnetically attractable head 37 at its outer extremity, and a metallic contact disc 38 at its inner extremity. A compression spring 39 surrounds the plunger and constantly urges the head 37 away from the cap 34 and against the tube 35.

The switch assembly is held in place in the housing 32 by means of a contact pin 40 which also serves to hold a first contact 41 in the path of the contact disc 38. A second contact 42, connected with the contact bushing 33, is also positioned in the path of the disc 38.

Thus, it can be seen that if the plunger 36 is drawn toward the cap 34, the contact disc 38 will close a circuit between the contacts 41 and 42. The plunger is drawn toward the cap at predetermined times by means of a permanent magnet 43 attached to the scale hand 13 in any suitable manner, such as by means of a resilient attachment clip 44. The weight of the magnet 43 may be counterbalanced by means of a suitable counterweight 53, if desired. The switches and the magnet 43 are so arranged that the latter will pass in close proximity to the caps 34 as the hand 13 travels around the index dial 11.

The contacts 41 of the various switch assemblies are connected in any desired signal circuits by means of suitable conductors 45 which may extend through the tubular switch arms 29 to a conductor conduit 46. The ground side of all circuits is through the switch arms 29, the hubs 19, the bearing tube 16, and the conduit 46.

The various switches can be positioned at any desired circumferential position about the dial 11 by means of a hand setting knob 47 mounted on the outer extremity of a setting rod 48 which is axially slidable and rotatable within the bearing tube 16. The rod 48 terminates at the rear extremity of the bearing tube in a terminal cap 49 from which an L-shaped setting arm 50 projects. Each of the arm brackets 27 is provided with a notch or socket 51 into which the extremity of the setting arm 50 may be engaged. The arm is resiliently maintained in engagement with the socket 51 by means of a compression spring 52 which constantly tends to urge the setting knob outwardly.

Thus, it can be seen that by forcing the knob rearwardly, the setting arm 50 can be rotated into alignment with any desired one of the sockets 52. If the knob is then released, the setting arm will be brought into engagement with the aligned notch by expansion of the spring 52. Rotation of the knob 47 will now rotate the engaged switch arm to any desired position in relation to the index dial 11. The same procedure can be followed with each of the switch arms to position the switches at desired points about the dial, as shown in Fig. 1. To assist in positioning the switch arms, each is provided with a pointer 54 extending into close proximity with the index scale of the dial.

Let us assume that the scale is being used to proportion batches for concrete work and that each batch is to contain 300 lbs. of cement, 2300 lbs. of sand, 1200 lbs. of gravel of one type, and 300 lbs. of a second type of gravel or other aggregate.

The first switch is set by means of the setting knob at the 300 lb. indication. The second switch is set at the 2600 lb. indication, the third switch is set at the 3800 lb. indication, and the fourth switch is set at the 4100 lb. indication.

Cement is allowed to flow into the scale hopper. The indicating hand 13 starts to travel along the index scale. When the hand reaches the 300 lb. indication, the permanent magnet 43 will actuate the first switch, causing it to close a signal circuit, whereupon the operator will stop the flow of cement. Sand will now flow into the scale hopper until the hand reaches the 2600 lb. indication, at which time the second switch will be magnetically actuated to give a "stop sand" signal. Gravel will then flow into the hopper until a third signal is given by the third switch at the 3800 lb. point, and then the final aggregate will flow into the hopper until the 4100 lb. indication is reached and the fourth signal is given by the fourth switch.

While the circuits have been described as signal circuits, the same switches could be connected in control circuits to operate devices to start and stop the flow of materials.

For more accurate controls, each switch arm could be provided with two spaced-apart switches mounted on a spacing bracket 55, as shown in Fig. 4. As the magnet 43 passes the first switch of the pair, it will give a warning signal known as a "dribble" signal. Upon receipt of this signal the feed will be slowed down, either manually or automatically, so that it can be stopped instantly when the hand reaches the second switch of that pair to give the final signal.

It has been found that the attraction of the magnet 43 for the plunger head 37 will tend to cause a slight irregular movement of the hand as the magnet approaches and departs from each switch. In the usual installation, this variation is so slight that it is not objectionable. However, where extreme accuracy is required, the alternate form of switch shown in Fig. 9 may be used.

The alternate form of switch is supported from a contact bushing 56 which frictionally receives the stud 31 similarly to the bushing 33 of the previous form. The bushing 56 carries a tubular switch barrel 57 of any suitable non-magnetic material such as plastic. A permanently magnetized fixed magnet 59 is fixedly secured in the barrel in any desired manner such as by means of a suitable set screw 58. A permanently magnetized floating magnet 60 is movably mounted in the barrel forwardly of the fixed magnet and is retained in place therein by means of a stop member 61. A ground contact 62, connected at one extremity to the bushing 56 extends into the barrel between the magnets 59 and 60. A second contact 63 extends into the barrel opposite the ground contact. The second contact is held in place in any desired manner such as by means of a contact screw 64 to which one of the conductors 45 is connected as in the previously described form.

The two magnets 59 and 60 are positioned with their like poles toward each other so that the floating magnet 60 is magnetically urged away from the fixed magnet 59 so as to normally rest against the stop member 61. A third bar-type permanent magnet 65 is fixedly mounted on the scale hand 13 by means of any suitable attachment clip 66. The magnet 65 is preset so that the pole directed toward the floating magnet 60 will correspond to the adjacent pole of the latter magnet to create a repulsive action thereon.

Thus as the hand 13 swings into alignment with the switch barrel 57, the floating magnet 60 will be repulsed by the magnet 65 to cause it to contact the two contacts 62 and 63 to close a circuit therebetween. The repulsion effect of the hand magnet 65 sufficiently exceeds the repulsion effect of the magnet 59 to cause the circuit to be closed at the contacts 62 and 63. The circuits, of course, are employed similarly to the previously described form but there appears to be little or no interference with the movements of the scale hand.

While specific forms of the improvement have been described and illustrated herein, it is to be understood that the same may be varied, within the scope of the appended claims without departing from the spirit of the invention.

Having thus described the invention, what is claimed and desired secured by Letters Patent is:

1. Means for use in combination with an indicating hand and an index dial of a weighing scale for closing an electric circuit when said hand reaches a predetermined position relative to said dial, comprising: a housing positioned forwardly of said dial; a front plate closing the front of said housing; a bearing device mounted on said front plate in axial alignment with the axis of said hand; a switch arm rotatably supported by said bearing device within said housing; a magnetically-operated switch carried by said arm adjacent said dial; and a permanent magnet attached to said hand and positioned to actuate said switch when said hand approaches the latter.

2. Means as described in claim 1 in which the means for rotating said switch arms comprises: a rod extending axially through said bearing device and being rotatably movable therein; an arm-engaging member on the inner extremity of said rod which can be brought into contact with any desired one of said switch arms; and means on the exterior of said housing for rotating said rod.

3. Means as described in claim 2 in which said rod is longitudinally movable in said bearing device so that it may be moved rearwardly to move said engaging member out of engagement with said switch arms; and having spring means acting to urge said engaging member forwardly into a position where it may engage said switch arms.

4. Means for use in combination with an indicating hand and an index dial of a weighing scale for closing an electric circuit when said hand reaches a predetermined position relative to said dial, comprising: a housing supported forwardly of said dial; a front plate closing the front of said housing; a bearing tube mounted in said front plate and extending into said housing in axial alignment with the axis of said hand; a plurality of hubs rotatably mounted on said bearing tube in side-by-side arrangement; a switch arm mounted on each hub and extending radially outward and rearward to a position adjacent said dial; a magnetically-operated switch carried at the rear extremity of each switch arm adjacent said dial; and a permanent magnet mounted on said indicating hand so as to swing into proximity with said switches for actuating the latter.

5. Means as described in claim 4 having a setting rod extending through said bearing tube into said housing; an arm-engaging member mounted on said rod within said housing and adapted to engage said switch arms for rotating the latter about said bearing tube; and means on the exterior of said face plate for actuating said rod.

6. Means for use in combination with an indicating hand and an index dial of a weighing scale for closing an electric circuit when said hand reaches a predetermined position relative to said dial, comprising: a magnetically-operated switch; means supporting said switch at said predetermined position; a permanent magnet carried by said hand and adapted to magnetically actuate said switch when said hand reaches said predetermined position, said magnetically-operated switch comprising: a tubular housing; means for securing said housing to said switch arm; electrical contacts in said housing; a longitudinally movable plunger in said housing; a circuit-closing device carried by said plunger; a magnetically-attractable head on said plunger adapted to be attracted by said magnet to draw said circuit-closing device into contact with said electrical contacts; and a spring acting to urge said circuit-closing device from said contacts.

7. Means as described in claim 6 in which the switch is positioned with the magnetically-attractable head directed radially inward toward the axis of said hand, and in which the permanent magnet is positioned to pass between said axis and said switch so as to attract the plunger radially inward.

8. A magnetically operated switch comprising: a tubular housing; a fixed permanent magnet mounted in said housing; a longitudinally movable floating permanent magnet mounted in said housing, like poles of the two magnets facing each other so that the floating magnet will be repelled by the fixed magnet; electrical contacts positioned between the said two magnets; and a third external permanent magnet adapted to pass in close proximity with said floating magnet, the adjacent poles of said third magnet and said floating magnet being of like polarity so that said third magnet will repel said floating magnet to contact with said contacts when said third magnet is in close proximity to said floating magnet.

References Cited in the file of this patent

UNITED STATES PATENTS

| | | |
|---|---|---|
| 754,005 | Olson | Mar. 8, 1904 |
| 2,249,369 | Williams | July 15, 1941 |
| 2,341,251 | Walther | Feb. 8, 1944 |
| 2,428,247 | Scott et al. | Sept. 30, 1947 |